United States Patent [19]
Lindsay et al.

[11] 3,897,430

[45] July 29, 1975

[54] SUBSTITUTED S-TRIAZINES AND METHOD OF USE

[75] Inventors: Harry Lee Lindsay; Robert Bruce Angier; William Vincent Curran, all of Pearl River, N.Y.

[73] Assignee: American Cyanamid Company, Stamford, Conn.

[22] Filed: Sept. 24, 1973

[21] Appl. No.: 399,909

[52] U.S. Cl. .......... 260/249.5; 260/249.8; 424/249; 260/248 CS
[51] Int. Cl. ............................................ C07d 55/18

[58] Field of Search ....................... 260/249.5, 249.8

[56] References Cited
UNITED STATES PATENTS
3,580,912   5/1971   Heimberger et al. ............ 260/249.5

Primary Examiner—John M. Ford
Attorney, Agent, or Firm—Ernest Y. Miller

[57] ABSTRACT

Preparation and use of substituted piperazinyl or piperidinyl aminoalkoxy-s-triazines are described. These compounds have antirhinoviral activity.

9 Claims, No Drawings

SUBSTITUTED S-TRIAZINES AND METHOD OF USE

DESCRIPTION OF THE INVENTION

This invention is concerned with substituted-s-triazines useful for their pharmacological activity.

The compounds of this invention may further be described as trisubstituted-s-triazines of the formula:

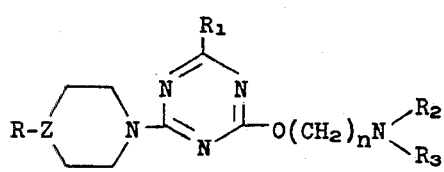

wherein R is hydrogen, lower alkyl, benzyl, phenyl, benzyloxycarbonyl or loweralkoxycarbonyl; $R_1$ is diloweralkylaminolower alkoxy, piperidinoloweralkoxy or methylpiperazinyl; $R_2$ and $R_3$ are lower alkyl; $NR_2R_3$ when taken together is piperidino; Z is nitrogen or CH and $n$ is 2 or 3.

The present invention also includes the pharmaceutically acceptable acid addition salts of the compounds of the above formula. Among these salts are the hydrochloride, hydrobromide, sulfate, maleate and citrate, all of which are prepared by methods well known to those skilled in the art.

The term loweralkyl or lower alkoxy is intended to include those having 1 to 4 carbon atoms.

The compounds of the present invention may be prepared as follows:

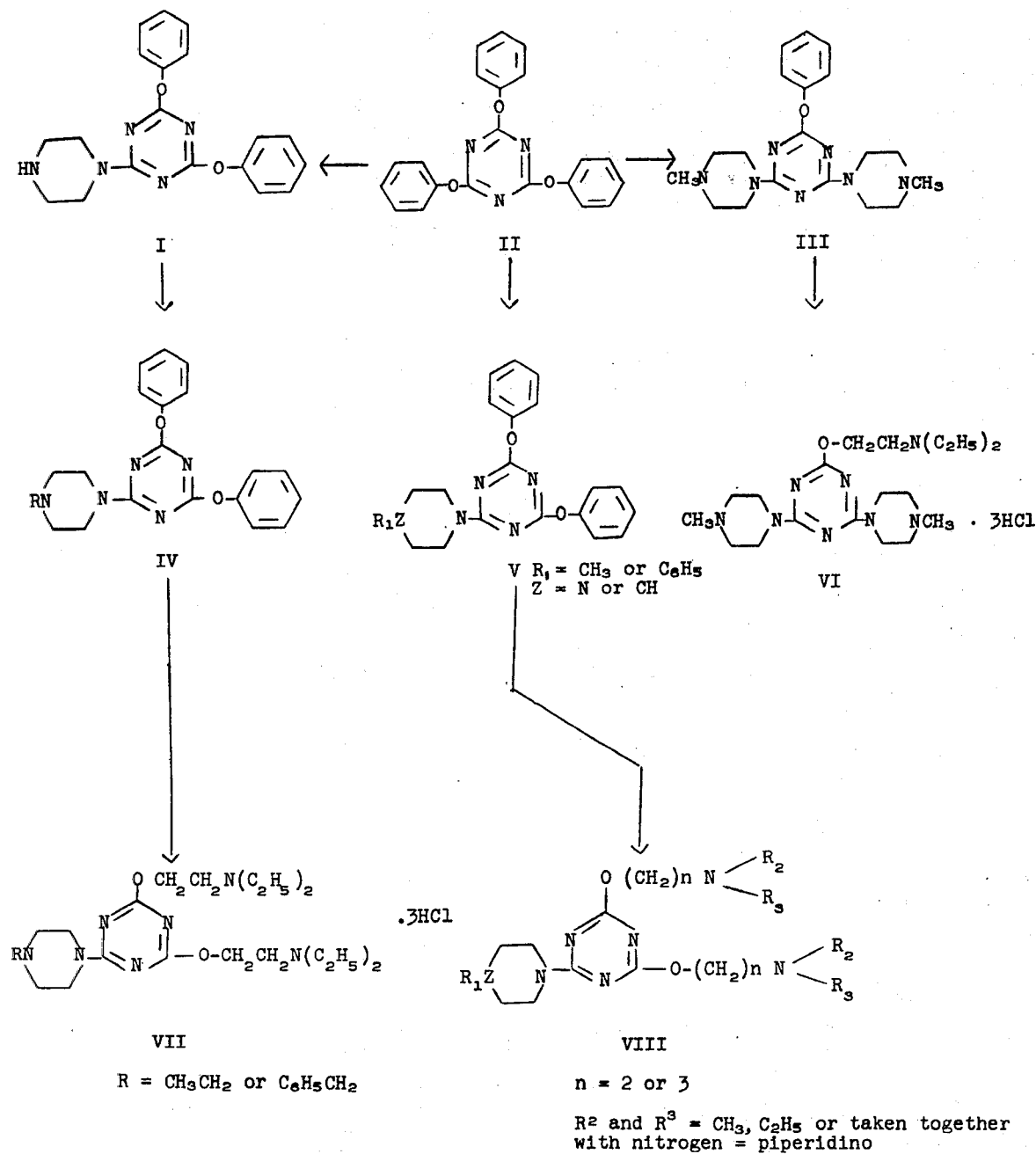

A solution of commercially available 2,4,6-triphenoxy-s-triazine (II) and 2 molar equivalents of 1-methylpiperazine, 1-phenylpiperazine or 4-methylpiperidine in dioxane is heated to 40°–55°C. for about 1 hour to give the monosubstituted derivative (V). Compound (V) is then treated with a dialkylaminoalkanol in the presence of potassium hydroxide at steam bath temperature to obtain a 2,4-bis(dialkylaminoalkoxy)6-amino substituted derivative (VIII).

Alternatively, a solution of 2,4,6-triphenoxy-s-triazine (II) and 4 molar equivalents of 1-methylpiperazine is heated to refluxing temperatures in dioxane for 4-8 hours to obtain the disubstituted derivative (III). Compound (III) is then treated with a dialkylaminoalkanol in the presence of potassium hydroxide at steam bath temperature to obtain a 2-dialkylaminoalkoxy-4,6-bis(4-methyl-piperazine-1-yl)-s-triazine (VI).

In a third method of preparing the present compounds, a solution of 4 molar equivalents of anhydrous piperazine in dioxane at 35°C. is added to 2,4,6-triphenoxy-s-triazine. This mixture is stirred at 35°C.-45°C. for 1 hour to obtain monosubstituted derivative (I). Compound (I) is treated with a lower alkyl or phenlower alkyl halide in ethanol to obtain compound (IV) where R is lower alkyl or phenlower alkyl. Compound (IV) is treated with a diloweralkylaminoalkanol in the presence of potassium hydroxide at steam bath temperature to obtain 2,4-bis(diloweralkylaminoloweralkoxy)-6-amino substituted derivative (VII).

with excess diethylaminoethanol at room temperature in the presence of sodium gives 2,4-bis(2-diethylaminoethoxy)-6-piperazinyl derivative (XIII) where R is ethyl or benzyl. Treatment of (XIII) (where R = benzyl) with 30% hydrogen bromide in acetic acid at room temperature gives 2,4-bis(2-diethylaminoethoxy)-6-(1-piperazinyl)-s-triazine (XII). Finally, methylation of (XII) with formic acid and formaldehyde at 50°-60°C. gives 2,4-bis(2-diethylaminoethoxy)-6-(4-methyl-1-piperazinyl)-s-triazine (XIV).

Among the compounds which may be prepared by the above procedures are the following:
2,4-bis(2-diethylaminoethoxy)-6-(4-methylpiperazin-1-yl)-s-triazine.
2,4-bis(2-dimethylaminoethoxy)-6-(4-methylpiperazin-1-yl)-s-triazine
2,4-bis(3-diethylaminopropoxy)-6-(4-methylpiperazin-1-yl)-s-triazine
2,4-bis(piperidinoethoxy)-6-(4-methylpiperazin-1-yl)-s-triazine
2,4-bis(2-diethylaminoethoxy)-6-(4-ethylpiperazin-1-yl)-s-triazine
2,4-bis(2-diethylaminoethoxy)-6-(4-phenylpiperazin-1-yl)-s-triazine
2,4-bis(2-diethylaminoethoxy)-6-(4-methylpiperidyl-1)-s-triazine
2,4-bis(2-diethylaminoethoxy)-6-[2-dimethylaminoethyl(methyl)amino]-s-triazine

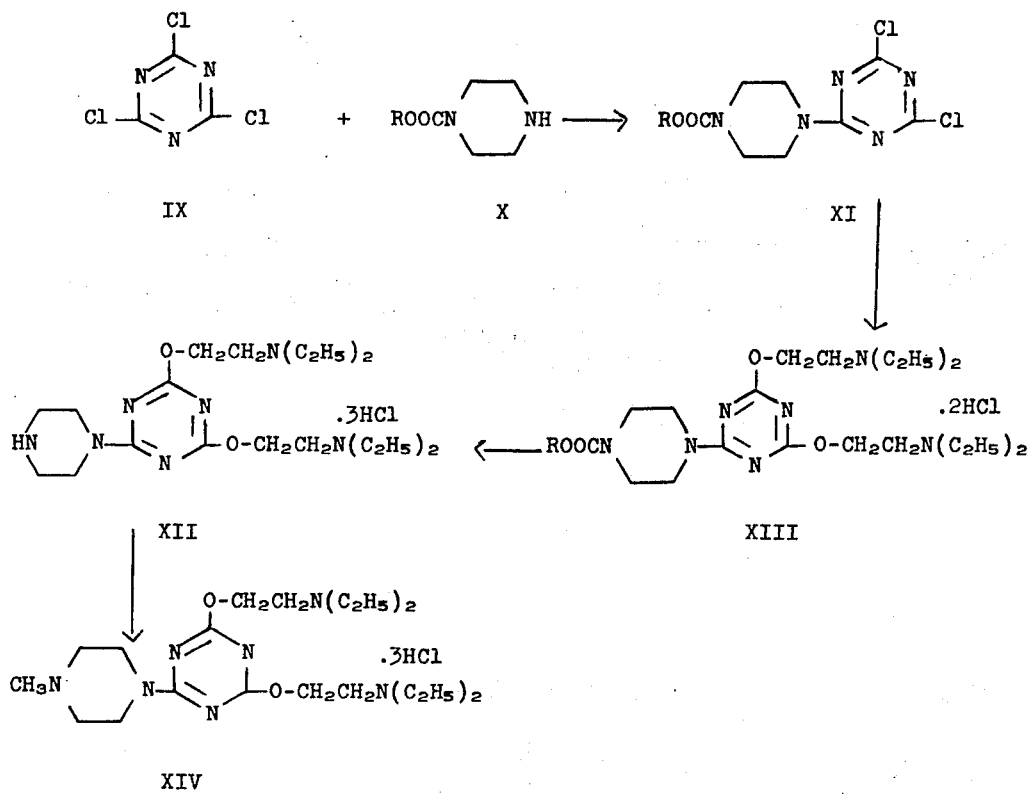

A slurry of cyanuric chloride (IX) in aqueous acetone is stirred at 0°–5°C. while adding slowly one molar equivalent of either ethylpiperazine-1-carboxylate or benzylpiperazine-1-carboxylate (X). Ten ml. of 10 N sodium hydroxide is then added to give the ethyl or benzyl derivative (XI). Treatment of compound (XI)

2,4-bis(4-methylpiperazin-1-yl)-6-(2-diethylaminoethoxy)-s-triazine
ethyl 4-[4,6-bis(2-diethylaminoethoxy)-s-triazine-2-yl]-1-piperazinecarboxylate
2,4-bis(2-diethylaminoethoxy)-6-(1-piperazinyl)-s-triazine 2,4-bis(2-diethylaminoethoxy)-6-(4-benzylpiperazin-1-yl)-s-triazine The compounds of the present invention exhibit antiviral activity in vitro against a variety of rhinoviruses. They are useful in treating warm-blooded animals in the form of a topical preparation such as a nasal spray or internally in the form of tablets, pills, capsules and the like. They may be administered in dosage units containing from about 10 mg. to 1,000 mg., two to four times a day.

Confluent monolayers of a continuous cell-line such as HeLa, HEp-2, KB or L-132 grown in plastic tissue culture dishes were infected with one of the viruses causing respiratory illness such as the "common cold." These viruses include members of the picornavirus group including the rhinoviruses, for example, types 1B, 2, 5, 14 or 23 and including the enteroviruses, for example, Coxsackie A-21. Protection of the tissues to the cytopathic effects of the viruses was ascertained by means of a plaque inhibition test in which the test compound was adsorbed onto a filter paper disc and placed on the agar used to overlay the infected cell monolayers, or by incorporation into the said agar overlay. The agar overlay medium used for this purpose was the following formulation: Minimum Essential Medium (Eagles) containing Earle's salts (Grand Island Biological Company, Grand Island, New York) and to which has been added

| | |
|---|---|
| Ionagar No. 2 | 0.4% |
| Diethylaminoethyl dextran | 0.01% |
| Magnesium chloride | 0.06% |
| Fetal calf serum | 2% v/v |

The virus-infected cell monolayers plus test compound were incubated for 3 to 5 days in a humidified atmosphere of 5% $CO_2$ at either 33° or 37°C., depending on the virus. The ability of these compounds to protect tissues from destruction by the viruses was then evident after staining the residual, uninfected cells with 0.5% crystal violet in 20% ethanol.

The results appear in Table I.

TABLE I

| Compound | Rhinovirus | | | | |
|---|---|---|---|---|---|
| | 2 | 5 | 14 | 23 | 1B |
| 2,4-bis(2-diethylaminoethoxy)-6-(4-methylpiperazin-1-yl)-s-triazine trihydrochloride | + | + | + | + | + |
| ethyl 4-[4,6-bis(2-diethylaminoethoxy)-s-triazin-2-yl]-1-piperazinecarboxylate dihydrochloride | + | | | + | + |
| 2,4-bis(2-diethylaminoethoxy)-6-(1-piperazinyl)-s-triazine trihydrobromide | + | | | + | |
| 2,4-bis(3-diethylaminopropoxy)-6-(4-methylpiperazin-1-yl)-s-triazine trihydrochloride | + | | | + | + |
| 2,4-bis(2-dimethylaminoethoxy)-6-(4-methylpiperazin-1-yl)-s-triazine trihydrochloride | + | + | + | + | + |
| 2,4-bis(piperidinoethoxy)-6-(4-methylpiperazin-1-yl)-s-triazine trihydrochloride | + | | + | + | + |
| 2,4-bis(4-methylpiperazin-1-yl)-6-(2-diethylaminoethoxy)-s-triazine trihydrochloride | + | | + | + | + |
| 2,4-bis(2-diethylaminoethoxy)-6-(4-benzylpiperazin-1-yl)-s-triazine trihydrochloride | + | | + | + | |
| 2,4-bis(2-diethylaminoethoxy)-6-(4-ethylpiperazin-1-yl)-s-triazine trihydrochloride | + | | | + | |

TABLE I – Continued

| Compound | Rhinovirus | | | | |
|---|---|---|---|---|---|
| | 2 | 5 | 14 | 23 | 1B |
| 2,4-bis(2-diethylaminoethoxy)-6-(4-phenylpiperazin-1-yl)-s-triazine trihydrochloride | + | | | + | + |
| 2,4-bis(2-diethylaminoethoxy)-6-(4-methylpiperidyl-1)-s-triazine trihydrochloride | + | | | + | + |

+ = Protects tissue from destruction by virus

In addition, 2,4-bis(2-diethylaminoethoxy)-6-(4-methylpiperazin-1-yl)-s-triazine trihydrochloride, 2,4-bis(2-dimethylaminoethoxy)-6-(4-methylpiperazin-1-yl)-s-triazine trihydrochloride, 2,4-bis(piperidinoethoxy)-6-(4-methylpiperazin-1-yl)-s-triazine trihydrochloride and 2,4-bis(2-diethylaminoethoxy)-6-[dimethylaminoethyl(methyl)amino]-s-triazine trimaleate are also active in providing protection against Coxsackie A-21 virus.

SPECIFIC DESCRIPTION

The following examples serve to further illustrate in detail the preparation of representative compounds of this invention.

EXAMPLE 1

Preparation of 2,4-bis(2-diethylaminoethoxy)-6-(4-methylpiperazin-1-yl)-s-triazine trihydrochloride A 500 ml. portion of dioxane is heated to 50°55°55+C. To this is added 54 gm. (0.15 mole) of 2,4,6-triphenoxy-s-triazine (Aldrich Chemical Co.) and 33.3 ml. (30.0 gm., 0.3 mole) of N-methylpiperazine. This mixture is stirred at 50°–55°C. for 1 hour. The solution is then filtered to remove a trace of solid and the filtrate is diluted with one liter of water to give a milky mixture from which a solid crystallizes. This solid is collected and air dried and then recrystallized from 150 ml. of ethanol yielding 43 gm. of the product, 2-(4-methylpiperazine-1-yl)-4,6-diphenoxy-s-triazine melting point 112°–115°C.

A 4.4 gm. (78 mmole) portion of potassium hydroxide is dissolved in 140 ml. of 2-diethylaminoethanol by stirring at room temperature. To this is added 12.5 gm. (35.5 mmoles) of 2-(4-methylpiperazin-1-yl)-4,6-diphenoxy-s-triazine (described above). This mixture is heated on a steam bath under a reflux condenser for 3 hours. The solution is evaporated in a flash evaporator first with water pump vacuum and then with oil pump vacuum using a water bath at 95°C. until all volatiles have been removed. The residue is slurried in about 150 ml. of ether until the syrup is all dissolved leaving a fine solid. This is filtered and the filter cake is washed with a small portion of ether. To the ether filtrate is added 25 ml. of water completely saturated with potassium carbonate. More potassium carbonate is added to the mixture. This is shaken vigorously and the ether is decanted. The residue is extracted with 5 × 200 ml. of ether. The combined ether extracts are dried over magnesium sulfate and then evaporated to a syrup at atmospheric pressure. The residue is dissolved in 35 ml. of ethanol and then treated with 25 ml. of 8N ethanolic HCl. This is seeded and cooled overnight to give a crystalline product which is collected, washed carefully with a small amount of cold ethanol and then with ether to give 6.2 gm. of product, melting point 223°–225°C. (decomp.).

The filtrate is treated with ether to a volume of 200 ml., cooled and filtered to give 3.0 gm. of product, melting point 206°–210°C. This material is crystallized from 70 ml. of ethanol using activated charcoal to yield 1.8 gm. of product, melting point 224°–226°C. Total yield 8.0 gm. of 2,4-bis(2-diethylaminoethoxy)-6-(4-methylpiperazin-1-yl)-s-triazine trihydrochloride.

EXAMPLE 2

Preparation of 2,4-bis(2-dimethylaminoethoxy)-6-(4-methylpiperazin-1-yl)-s-triazine trihydrochloride A solution of 10.0 gm. (27.6 mmoles) of 2-(4-methylpiperazin-1-yl)-4,6-diphenoxy-s-triazine (Example 1) in 120 ml. of 0.5N potassium hydroxide in freshly distilled 2-dimethylaminoethanol is heated on a steam bath for 3 hours. The solution is evaporated to a syrup in a flash evaporator using first a water pump and then an oil pump with a water bath at 95°C. The residue is dissolved in 150 ml. of ether. To this is added 15 ml. of water saturated with potassium carbonate. A little excess potassium carbonate is added. The ether is decanted and the residue is extracted with 4 × 150 ml. portions of ether. The ether solution is dried with magnesium sulfate, filtered and the filtrate is evaporated to a syrup. This syrup is dissolved in 15 ml. of ethanol. A 15 ml. portion of 7.5N ethanolic hydrogen chloride is added. Another 10 ml. of ethanol is added and the mixture is allowed to stand overnight yielding a crystalline product. More ethanol and ether are added to permit filtering. The product is collected and dried yielding 8.8 gm. of product melting point 224°–227°C. (decomp.).

EXAMPLE 3

Preparation of 2,4-bis(3-diethylaminopropoxy)-6-(4-methylpiperazin-1-yl)-s-triazine trihydrochloride A solution of 9 gm. (24.9 mmoles) of 2-(4-methylpiperazin-1-yl)-4,6-diphenoxy-s-triazine, 3.0 gm. (53 mmoles) of potassium hydroxide and 100 gm. of 3-diethylaminopropyl alcohol is heated on a steam bath for 3 hours. The solution is evaporated to dryness in a flash evaporator using an oil pump and a water bath at 95°C. The residue is slurried in 150 ml. of ether and filtered. The filtrate is treated with a solution of 15 ml. of water saturated with potassium carbonate. Some excess potassium carbonate is added. This mixture is thoroughly shaken and the ether is decanted. This extraction is repeated with 3 × 100 ml. of ether. The ether is dried over magnesium sulfate and evaporated to a syrup. This syrup is dissolved in 20 ml. of ethanol, treated with 15 ml. of 7.5N ethanolic hydrogen chloride and cooled overnight. The mixture is slurried and cooled further to give 8.2 gm. of white crystalline solid, melting point 221°–223° C. This product is recrystallized from 100 ml. of ethanol with the aid of activated charcoal, yielding 5.6 gm. of product melting point 230°C–232°C.

EXAMPLE 4

Preparation of 2,4-bis(piperidinoethoxy)-6-(4-methylpiperazin-1-yl)-s-triazine trihydrochloride A solution of 9 gm. (24.9 mmole) of 2-(4-methylpiperazin-1-yl)-4,6-diphenoxy-s-triazine, 3.0 gm. (53 mmole) of potassium hydroxide and 100 ml. of piperidine-1-ethanol is heated on a steam for 3 hours. This is worked up as in Example 3 to give 13 gm. of syrup. The syrup is dissolved in 30 ml. of ethanol and treated with 15 ml. of 7.5N ethanolic hydrogen chloride to give the crystalline product, yield 7.3 gm. This product is recrystallized from 150 ml. of ethanol, yielding 5.6 gm. of product.

EXAMPLE 5

Preparation of 2,4-bis(2-diethylaminoethoxy)-6-(4-benzylpipera-1-yl)-s-triazine trihydrochloride To a stirred solution of 8.6 gm. (0.1 mole) of anhydrous piperazine in 100 ml. of dioxane at 35°C. is added 9.0 gm. (.025 mole) of 2,4,6-triphenoxy-s-triazine. The temperature rises to 42°C. This mixture is stirred for 40 minutes during which time the temperature drops to 33°C. The solution is filtered and diluted with water to volume of 400 ml. giving a crystalline product, 2-piperazin-1-yl-4,6-diphenoxy-s-triazine; yield 6.0 gm., melting point 137°–141°C. This product recrystallized from 60 ml. of ethanol; yield 4.1 gm. melting point 149°–152°C.

A solution of 7.0 gm. (20 mmoles) of 2-piperazin-1-yl-4,6-diphenoxy-s-triazine (prepared above) in 100 ml. of ethanol at about 50°C. is treated with 2.6 gm. (2.4 ml.) (20 mmoles) of benzyl chloride and heated to reflux for 5 hours. Another 0.2 ml. of benzyl chloride is added and the solution is refluxed for an additional 1 hour. The mixture is cooled to room temperature, treated with a small portion of water and then with excess potassium carbonate (8 gm.), and then with excess water. A gum separates which solidifies on cooling overnight yielding 8.3 gm. of 2-(4-benzylpiperazin-1-yl)-4,6-diphenoxy-s-triazine; melting point 125°–128°C. This product is recrystallized from 125 ml. of ethanol with the aid of activated carbon yielding 6.6 gm. of product; melting point 129°–131°C.

The procedure of Example 2 is repeated employing 6.15 gm. (14 mmoles) of 2-(4-benzylpiperazin-1-yl)-4,6-diphenoxy-s-triazine, (prepared above) 70 ml. of 2-diethylaminoethanol and 1.7 gm. (30 mmoles) of potassium hydroxide. In this instance it is necessary to add ether to the ethanolic hydrogen chloride solution to get an oil which then crystallizes yielding 4.5 gm. of solid; melting point 210°–216°C. This product, 2,4-bis-(2-diethylaminoethoxy)-6-(4-benzylpiperazin-1-yl)-s-triazine trihydrochloride, is recrystallized from 30 ml. of ethanol and 5 ml. of dioxane with the aid of activated charcoal yielding 3.4 gm. of product; melting point 209°–211°C.

EXAMPLE 6

Preparation of 2,4-bis(2-diethylaminoethoxy)-6-(4-ethylpiperazin-1-yl)-s-triazine trihydrochloride To a solution of 7.0 gm. (20 mmoles) of 2-piperazin-1-yl-4,6-diphenoxy-s-triazine (Example 5) in 100 ml. of warm ethanol is added 1.8 ml. (21 mmoles) of ethyl iodide. This mixture is heated to reflux for 4 hours, then another 0.2 ml. of ethyl iodide is added. The mixture is again heated to refluxing temperature for 4 hours and then cooled overnight. A thick oil separates. The supernatant is decanted, treated with excess potassium carbonate and several volumes of water and cooled to give a crystalline solid, 5.0 gm., melting point 129°–133°C. This solid is recrystallized from 25 ml. of ethanol leaving some insoluble residue behind; yield 3.4 gm. of 2-(4-ethylpiperazin-1-yl)-4,6-diphenoxy-s-triazine, melting point 134°–136°C.

To a solution of 1.1 gm. (20 mmoles) of potassium hydroxide in 60 ml. of 2-diethylaminoethanol is added 3.4 gm. (9.0 mmoles) of 2-(4-ethylpiperazin-1-yl)-4,6-diphenoxy-s-triazine (prepared above). This mixture is treated as described in Example 2. It is necessary to add a little ether to recover 3.5 gm. of product. This is extracted with 50 ml. hot ethanol leaving 2 gm. of material. This product, 2,4-bis(2diethylaminoethoxy)-6-(4-ethylpiperazin-1-yl)-s-triazine trihydrochloride, is recrystallized from 150 ml. of ethanol and collected by centrifugation, yielding 1.4 gm. of product; melting point 227°–228°C.

EXAMPLE 7

Preparation of 2,4-bis(2-diethylaminoethoxy)-6-(4-phenylpiperazin-1-yl)-s-triazine trihydrochloride A mixture of 18.0 gm. (0.05 mole) of 2,4,6-triphenoxy-s-triazine, 16.2 gm. (0.1 mole) of 4-phenylpiperazine and 200 ml. of dioxane is stirred at 40°–50°C. for 1½ hours. The reaction mixture is filtered. The filtrate is diluted to about 600 ml. with water to give a crystalline product, 2-(4-phenylpiperazin-1-yl)-4,6-diphenoxy-s-triazine, 22 gm., melting point 187°–191°C. This is recrystallized from 300 ml. of methyl cellosolve yielding 19.5 gm. of product, melting point 194°–196°C.

A solution of 10.6 gm. (25 mmoles) of 2-(4-phenylpiperazin-1-yl)-4,6-diphenoxy-s-triazine (prepared above) and 3.0 gm. (54 mmoles) of potassium hydroxide in 120 ml. of diethylaminoethanol is heated on a steam bath for 4 hours and then treated as described in Example 2.

The product, 2,4-bis(2-diethylaminoethoxy)-6-(4-phenylpiperazin-1-yl)-s-triazine trihydrochloride, is recrystallized with the aid of activated charcoal from a solution of 85 ml. of n-propanol and 20 ml. of dioxane, yielding 5.5 gm.

EXAMPLE 8

Preparation of 2,4-bis(2-diethylaminoethoxy)-6-(4-methylpiperidyl-1)-s-triazine trihydrochloride A solution of 18.0 gm. (0.05 mole) of 2,4,6-triphenoxy-s-triazine, 12.7 ml. (11 gm., 0.11 mole) of 4-methylpiperidine and 200 ml. of dioxane is stirred at 50°C. for 1 hour, filtered and diluted with 2 volumes of water to give a solid product, 2-(4-methylpiperidyl-1)-4,6-diphenoxy-s-triazine. This is recrystallized from 60 ml. of ethanol yielding 15.3 gm. of product; melting point 119°–121°C.

A solution of 10.9 gm. (30 mmoles) of 2-(4-methylpiperidyl-1)-4,6-diphenoxy-s-triazine (prepared above) and 3.7 gm. (66 mmoles) of potassium hydroxide in 120 ml. of 2-diethylaminoethanol is treated as described in Example 2, yielding a crystalline product. This is recrystallized with the aid of activated charcoal from a solution of 40 ml. of n-propanol and 50 ml. of dioxane. The product is dissolved in 35 ml. of ethanol, filtered, treated with 10 ml. of 8N ethanolic hydrogen chloride and then with ether and cooled yielding 4.9 gm. of 2,4-bis(2-diethylaminoethoxy)-6-(4-methylpiperidyl-1)-s-triazine trihydrochloride, melting point 153°–163°C.

EXAMPLE 9

Preparation of 2,4-bis(4-methylpiperazin-1-yl)-6-(2-diethylaminoethoxy)-s-triazine trihydrochloride A solution of 21.6 gm. (60 mmoles) of 2,4,6-triphenoxy-s-triazine, 27.6 ml. (25.2 gm., 241 mmoles) of N-methylpiperazine and 200 ml. of dioxane is heated to reflux for 6 hours. This mixture is treated with activated charcoal and then filtered. The filtrate is evaporated to a syrup which is dissolved in 60 ml. of ethanol. A small portion of water is added while the mixture is still warm and this is cooled overnight yielding a crystalline product. More water is added to give a thick slurry and the mixture is filtered.

The product is recrystallized from 600 ml. of heptane; yield 24.7 gm.; melting point 104°–106°C. This is the diphenol salt of the compound.

This product is dried in a pistol over ethanol for 7 hours yielding the compound, 2,4-bis(4-methylpiperazine-1-yl)-6-phenoxy-s-triazine, melting point 120°–122°C.

A solution of 9.3 gm. (25 mmoles) of 4,6-bis(4-methylpiperazin-1-yl)-2-phenoxy-s-triazine (prepared above) and 1.4 gm. (25 mmoles) of KOH is 90 ml. of 2-diethylaminoethanol is heated on a steam bath for 3 hours. This mixture is treated as described in Example 2, yielding 9.3 gm. of product, 2,4-bis-(4-methylpiperazin-1-yl)-6-(2-diethylaminoethoxy)-s-triazine trihydrochloride.

This product is recrystallized from 125 ml. of ethanol containing a few drops of water to give complete solution. The yield is 7.8 gm., melting point 238°–241°C.

EXAMPLE 10

Preparation of ethyl 4-[4,6-bis(2-diethylaminoethoxy)-s-triazine-2-yl]-1-piperazinecarboxylate dihydrochloride An 18.4 gm. (0.1 mole) portion of cyanuric chloride is boiled in 40 ml. of acetone and poured onto 60 ml. of icewater. The mixture is stirred at 0°–5°C. and ethylpiperazine-1-carboxylate (15.8 gm., 0.1 mole) dissolved in a small volume of acetone is added over a period of 40 minutes followed by 10 ml. of 10N sodium hydroxide. After stirring for an additional hour, the product is collected and dried. The product, ethyl 4-(4,6-dichloro-s-triazine-2-yl)-1-piperazinecarboxylate, is recrystallized from ethyl acetate using activated charcoal; yield 23.5 gm; melting point 166°–170°C.

A 3.1 gm. (0.01 mole) portion of ethyl 4-(4,6-dichloro-s-triazin-2-yl)-1-piperazinecarboxylate (prepared above) is added to a solution of 0.46 gm. (0.02 mole) sodium in 12.0 ml. of diethylaminoethanol. The mixture is stirred for 3 hours at room temperature and then diluted with 50 ml. of ether and filtered. The filtrate is evaporated to an oily residue and the excess diethylaminoethanol is removed using a vacuum pump and a dry-ice trap. The residue is taken up in 50 ml. of ether and saturated with anhydrous hydrogen chloride yielding a gelatinous solid which is collected and crystallized from ethanol twice yielding 2.2 gm. of ethyl 4-[4,6-bis(2-diethylaminoethoxy)-s-triazine-2-yl]-1-piperazinecarboxylate dihydrochloride, melting point 216°–218°C. (decomp.).

EXAMPLE 11

Preparation of Benzyl 4-[4,6-bis(2-diethylaminoethoxy)-s-triazin-2-yl]-1-piperazinecarboxylate dihydrochloride An 18.4 gm. (0.10 mole) portion of cyanuric chloride is boiled in 60 ml. of acetone and poured onto 70 gm. of ice. The resulting slurry is placed in an ice-salt bath and 22.0 gm. (0.10 mole) of benzyl piperazine-1-carboxylate, dissolved in a small volume of acetone, is added over a 1 hour period. A 10 ml. (0.10 mole) portion of 10N sodium hydroxide is added over a 20-30 minute period. Stirring is continued for an additional 30 minutes. The product, benzyl 4-(4,6-dichloro-s-triazin-2-yl)-1-piperazinecarboxylate, is collected, dried and recrystallized twice from ethyl acetate; yield 22.1 gm.; melting point 129°–134°C.

Benzyl 4-(4,6-dichloro-s-triazin-2-yl)-1-piperazinecarboxylate (prepared above) (20.0 gm., 0.054 mmoles) is added to a solution of 2.5 gm. (0.108 mole) of sodium in 60 ml. of diethylaminoethanol. The mixture is stirred for 1 hour, then allowed to stand at room temperature overnight. A 100 ml. portion of ether is added and the mixture is filtered. The filtrate is evaporated using a dry-ice trap and vacuum pump to remove the excess diethylaminoethanol. The residue is triturated with 150 ml. of ether which has previously been saturated with anhydrous hydrogen chloride in an ice bath. The ether is decanted and the residue is triturated with a fresh portion of ether. The ether is again decanted and the residue is dissolved in 150 ml. of absolute ethanol. This extraction procedure is repeated and the residue is crystallized from 100 ml. of ethanol; yield 4.6 gm., melting point 181°–185°C.

The addition of ether to the mother liquor gave additional crystals of benzyl 4-[4,6-bis(2-diethylaminoethoxy)-s-triazin-2-yl]-1-piperazinecarboxylate dihydrochloride; yield 11.75 gm.; melting point 181°–185°C.

EXAMPLE 12

Preparation of 2,4-bis(2-diethylaminoethoxy)-6-(1-piperazinyl)-s-triazine trihydrobromide A 10.9 gm. (0.017 mole) portion of benzyl 4-[4,6-bis(2-diethylaminoethoxy)-s-triazin-2-yl]-1-piperazinecarboxylate (Example 12) is dissolved in 55 ml. of 30% HBr in acetic acid and allowed to stand at room temperature for one hour. The solution is diluted with 150 ml. of ether to give a thick gum which is triturated with several fresh portions of ether and crystallized from ethanol. This product is recrystallized from ethanol; yield 7.2 gm.; melting point 192°–194°C.

EXAMPLE 13

Preparation of 2,4-bis(2-diethylaminoethoxy)-6-(4-methyl-1piperazinyl)-s-triazine trihydrochloride A 5.0 gm. (7.8 mmole) portion of 2,4-bis(2-diethylaminoethoxy)-6-(1-piperazinyl)-s-triazine trihydrochloride (Example 12) is dissolved in 5.0 ml. of water and added to a solution of 20 ml. of formic acid and 20 ml. of formaldehyde. The reaction mixture is heated in a water bath at 50°–60°C. for 8 hours and then evaporated to dryness. The residue is recrystallized from ethanol-ether. This product is recrystallized from ethanol; yield 1.7 gm., melting point 213°–215°C. Nuclear magnetic resonance indicates this crop contained about 70% of the desired 4-methyl product and 30% of unreacted starting material. The compound was purified by partition chromatography, yielding 0.819 gm., of product; melting point 223°–226°C.

We claim:
1. A trisubstituted-s-triazine selected from the group consisting of those of the formula:

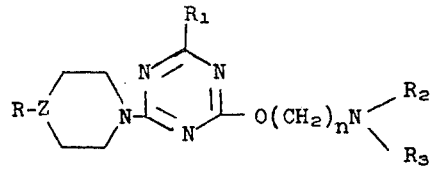

wherein R is hydrogen, lower alkyl, benzyl, phenyl, benzyloxycarbonyl or loweralkoxycarbonyl; $R_1$ is diloweralkylaminolower alkoxy, piperidinoloweralkoxy or methylpiperazinyl; $R_2$ and $R_3$ are lower alkyl; $NR_2R_3$ when taken together is piperidino; Z is nitrogen or CH; n is 2 or 3 and pharmaceutically acceptable acid addition salts thereof.

2. The trisubstituted-s-triazine in accordance with claim 1, 2,4-bis(2-diethylaminoethoxy)-6-(4-methylpiperazin-1-yl)-s-triazine.

3. The trisubstituted-s-triazine in accordance with claim 1, 2,4-bis(2-dimethylaminoethoxy)-6-(4-methylpiperazin-1-yl)-s-triazine.

4. The trisubstituted-s-triazine in accordance with claim 1, 2,4-bis(piperidinoethoxy)-6-(4-methylpiperazin-1-yl)-s-triazine.

5. The trisubstituted-s-triazine in accordance with claim 1, 2,4-bis(4-methylpiperazin-1-yl)-6-(2-diethylamino-ethoxy)-s-triazine.

6. The trisubstituted-s-triazine in accordance with claim 1, 2,4-bis(3-diethylaminopropoxy)-6-(4-methylpiperazin-1-yl)-s-triazine.

7. The trisubstituted-s-triazine in accordance with claim 1, 2,4-bis(2-diethylaminoethoxy)-6-(4-benzylpiperazin-1-yl)-s-triazine.

8. The trisubstituted-s-triazine in accordance with claim 1, 2,4-bis(2-diethylaminoethoxy)-6-(4-phenylpiperazin-1-yl)-s-triazine.

9. The trisubstituted-s-triazine in accordance with claim 1, 2,4-bis(2-diethylaminoethoxy)-6-(4-methylpiperidyl-1)-s-triazine.

* * * * *